(12) United States Patent
Katata et al.

(10) Patent No.: US 7,515,519 B2
(45) Date of Patent: Apr. 7, 2009

(54) INFORMATION RECORDING MEDIUM, INFORMATION RECORDING DEVICE AND METHOD, AND COMPUTER PROGRAM

(75) Inventors: Keiji Katata, Saitama (JP); Masayoshi Yoshida, Saitama (JP); Toshiro Tanikawa, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 120 days.

(21) Appl. No.: 11/662,939

(22) PCT Filed: Sep. 14, 2005

(86) PCT No.: PCT/JP2005/016911

§ 371 (c)(1),
(2), (4) Date: May 15, 2007

(87) PCT Pub. No.: WO2006/030813

PCT Pub. Date: Mar. 23, 2006

(65) Prior Publication Data

US 2007/0258350 A1    Nov. 8, 2007

(30) Foreign Application Priority Data

Sep. 17, 2004    (JP) ............................ 2004-271374

(51) Int. Cl.
*G11B 7/00* (2006.01)
(52) U.S. Cl. ...................................................... 369/94
(58) Field of Classification Search ................. 369/94
See application file for complete search history.

(56) References Cited

U.S. PATENT DOCUMENTS

| 6,370,102 | B1* | 4/2002 | Mons et al. ................... 369/94 |
| 7,423,952 | B2* | 9/2008 | Shishido et al. ............... 369/94 |
| 2002/0159382 | A1 | 10/2002 | Ohata et al. |
| 2005/0030864 | A1* | 2/2005 | Tokumoto ..................... 369/94 |
| 2006/0083141 | A1* | 4/2006 | Teranishi et al. .............. 369/94 |

FOREIGN PATENT DOCUMENTS

| JP | 09-259438 | 10/1997 |
| JP | 11-185390 | 7/1999 |
| JP | 2001-023170 | 1/2001 |
| JP | 2002-352469 | 12/2002 |

* cited by examiner

*Primary Examiner*—Thang V Tran
(74) *Attorney, Agent, or Firm*—Young & Thompson

(57) ABSTRACT

An information recording medium (100), provided with: a first recording layer (L0 layer) and a second recording layer (L1 layer) in which record information can be recorded; and a plurality of first block areas, each of which includes a recording area (105a) of a first size on the first recording layer and a recording area (115a) on the second recording layer located at a position facing the recording area of the first size on the first recording layer, and each of which is a unit by which the record information is recorded, at least one of the first recording layer and the second recording layer comprising a size area (104, 114) to record therein first size information (121) which indicates the first size.

15 Claims, 10 Drawing Sheets

(a)

(b)

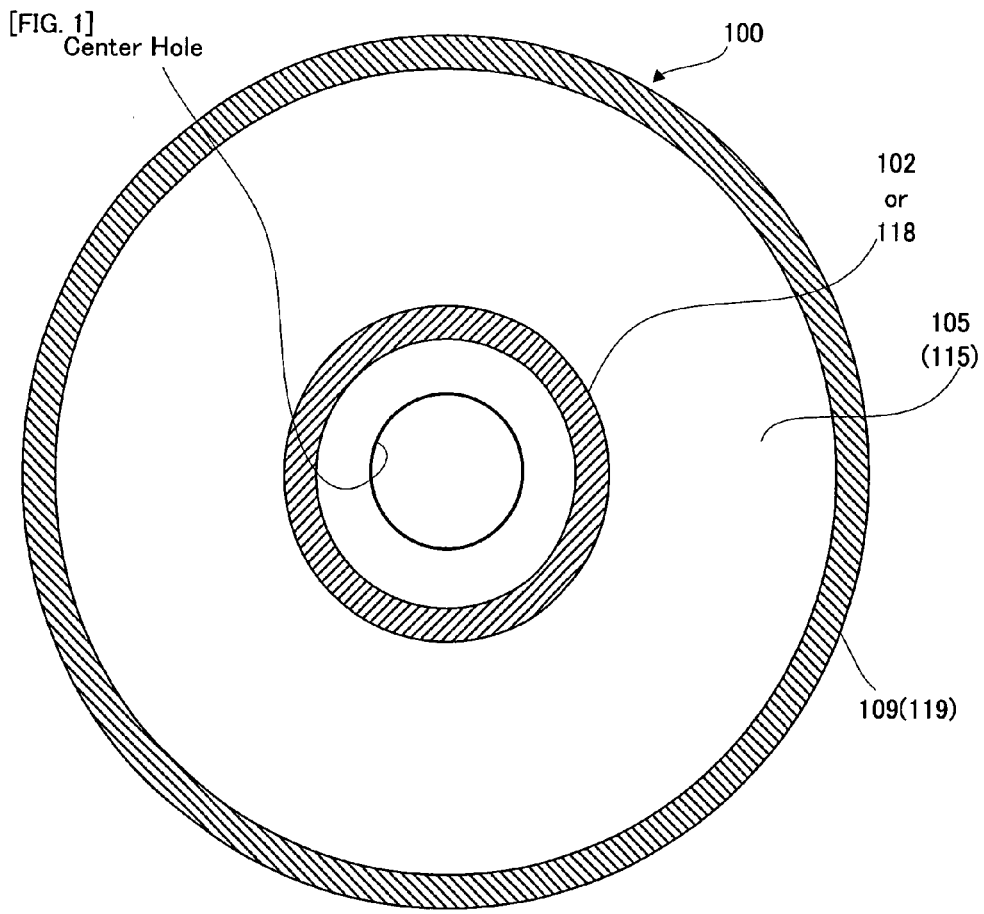
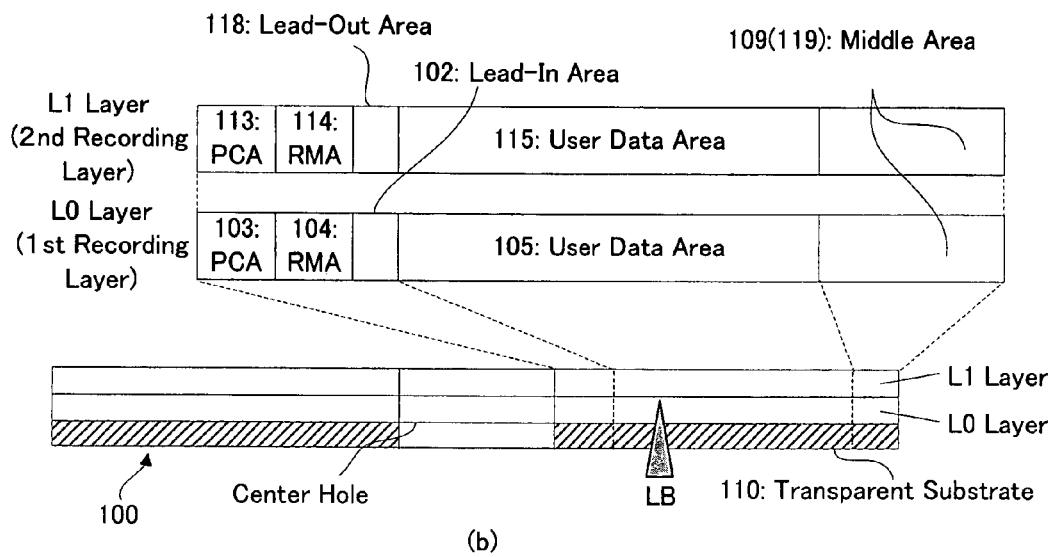

[FIG. 2]
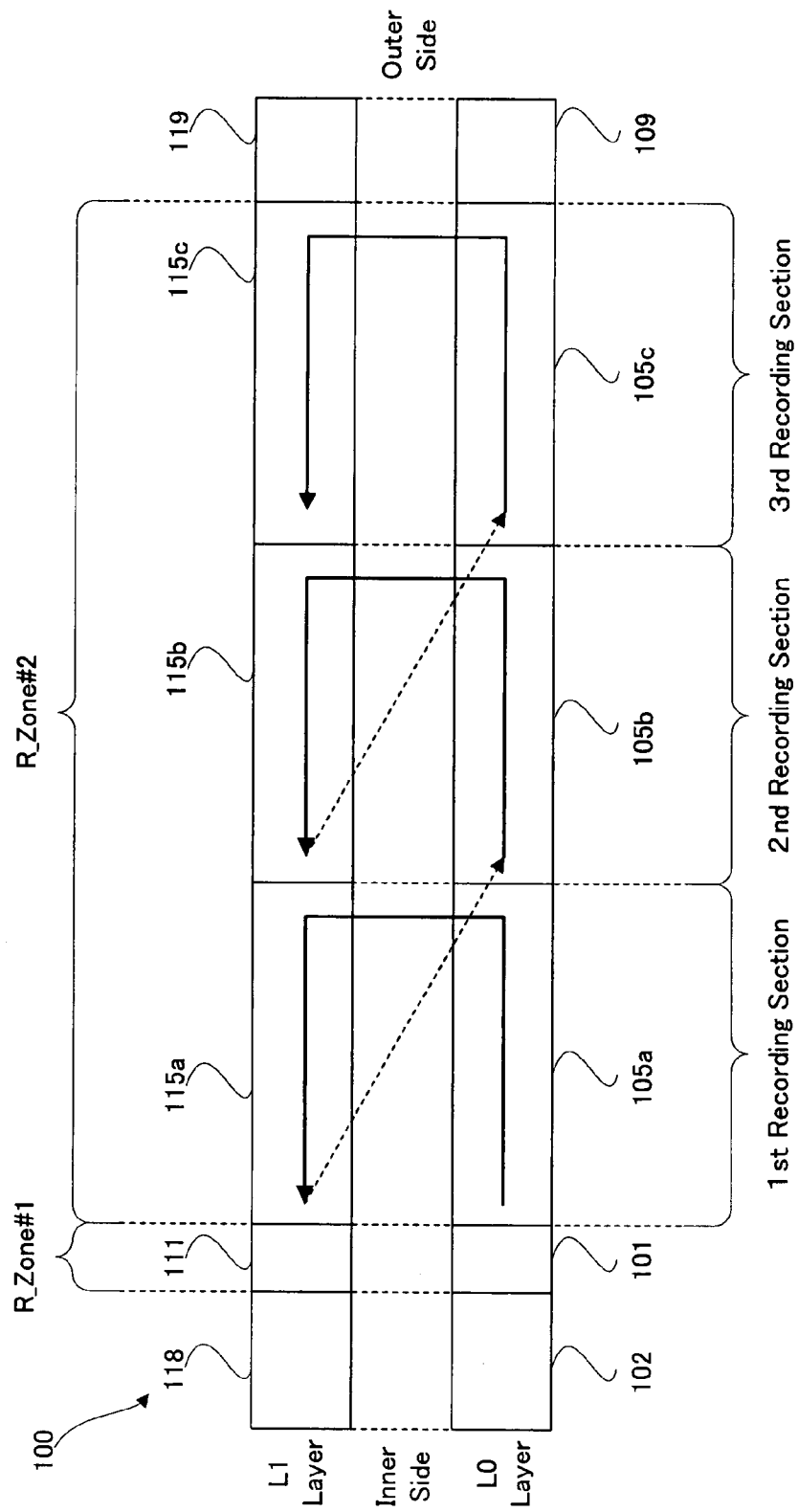

[FIG. 3]

| Byte Position | Content | Size |
|---|---|---|
| 0 to 1 | Invisible R_Zone Number | 2 Byte |
| 2 to 3 | 1st Open R_Zone Number | 2 Byte |
| 4 to 5 | 2nd Open R_Zone Number | 2 Byte |
| 6 to 13 | Reserved | 10 Byte |
| 14 to 15 | Layer Jump Interval | 2 Byte |
| 16 to 19 | Start Sector Number (R_Zone#1) | 4 Byte |
| 20 to 23 | Layer Jump Address (R_Zone#1) | 4 Byte |
| 24 to 27 | End Sector Number (R_Zone#1) | 4 Byte |
| 28 to 31 | Last Recorded Address (R_Zone#1) | 4 Byte |
| 32 to 35 | Start Sector Number (R_Zone#2) | 4 Byte |
| ⋮ | ⋮ | 4 Byte |

121

[FIG. 4]
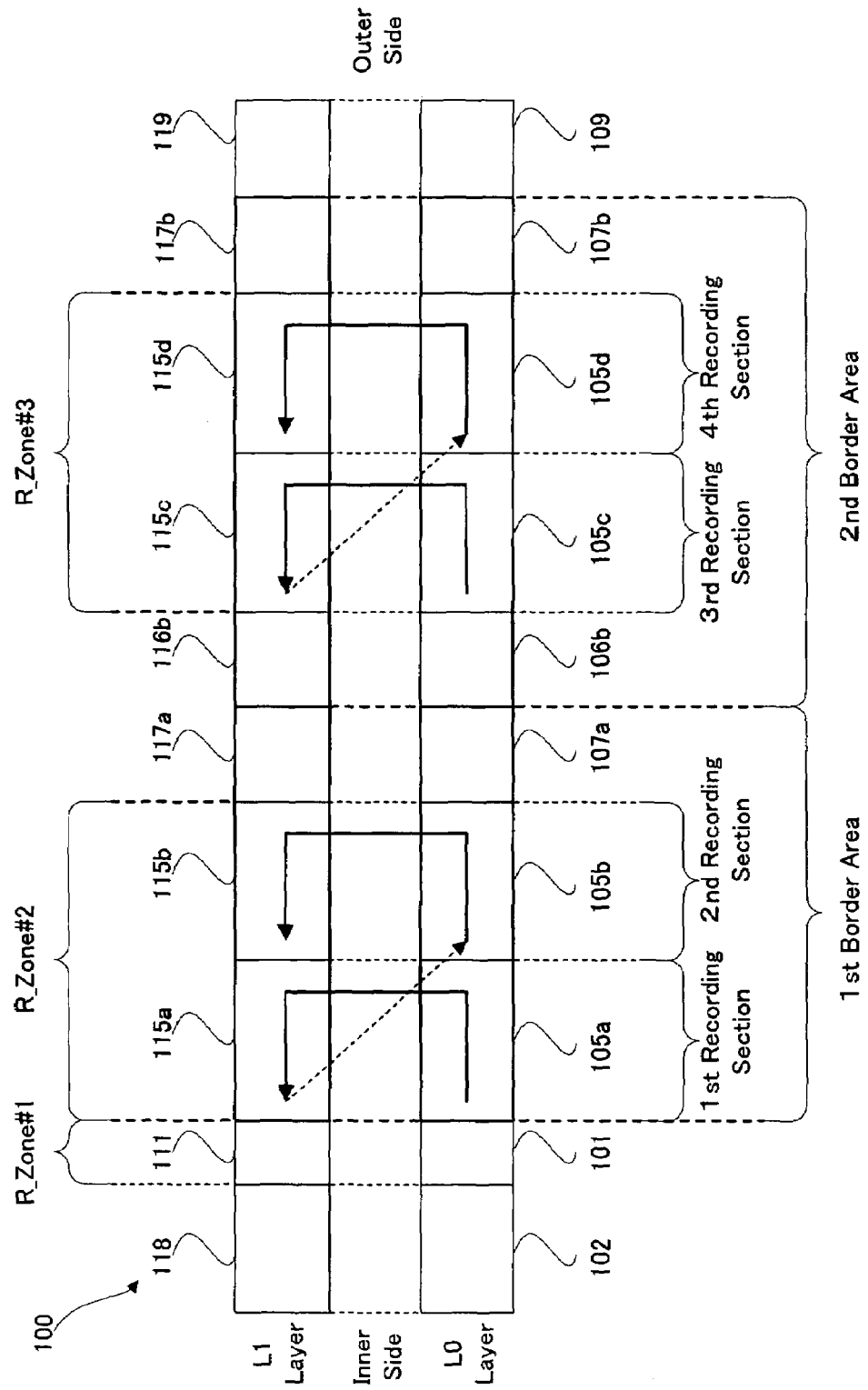

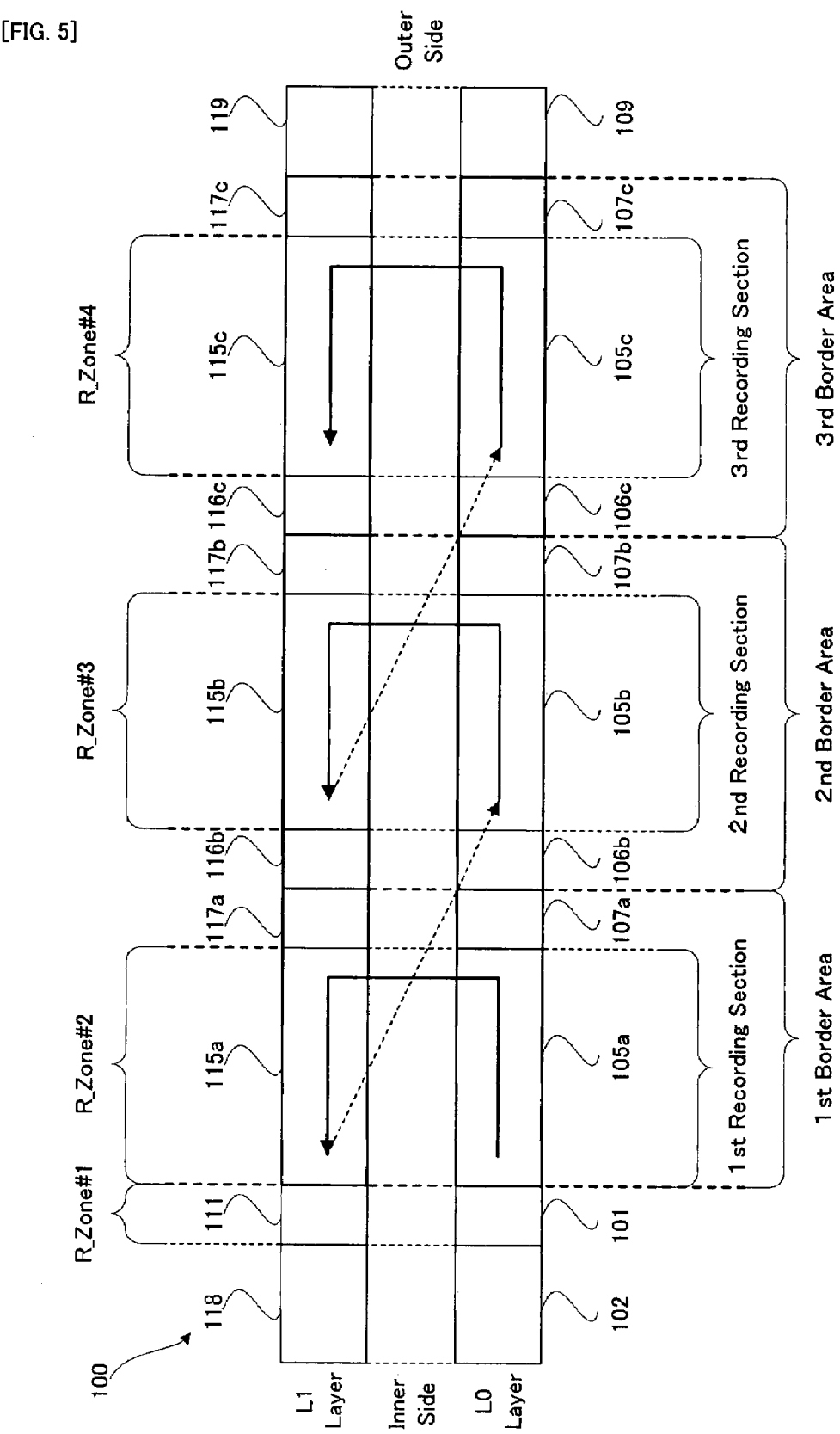
[FIG. 5]

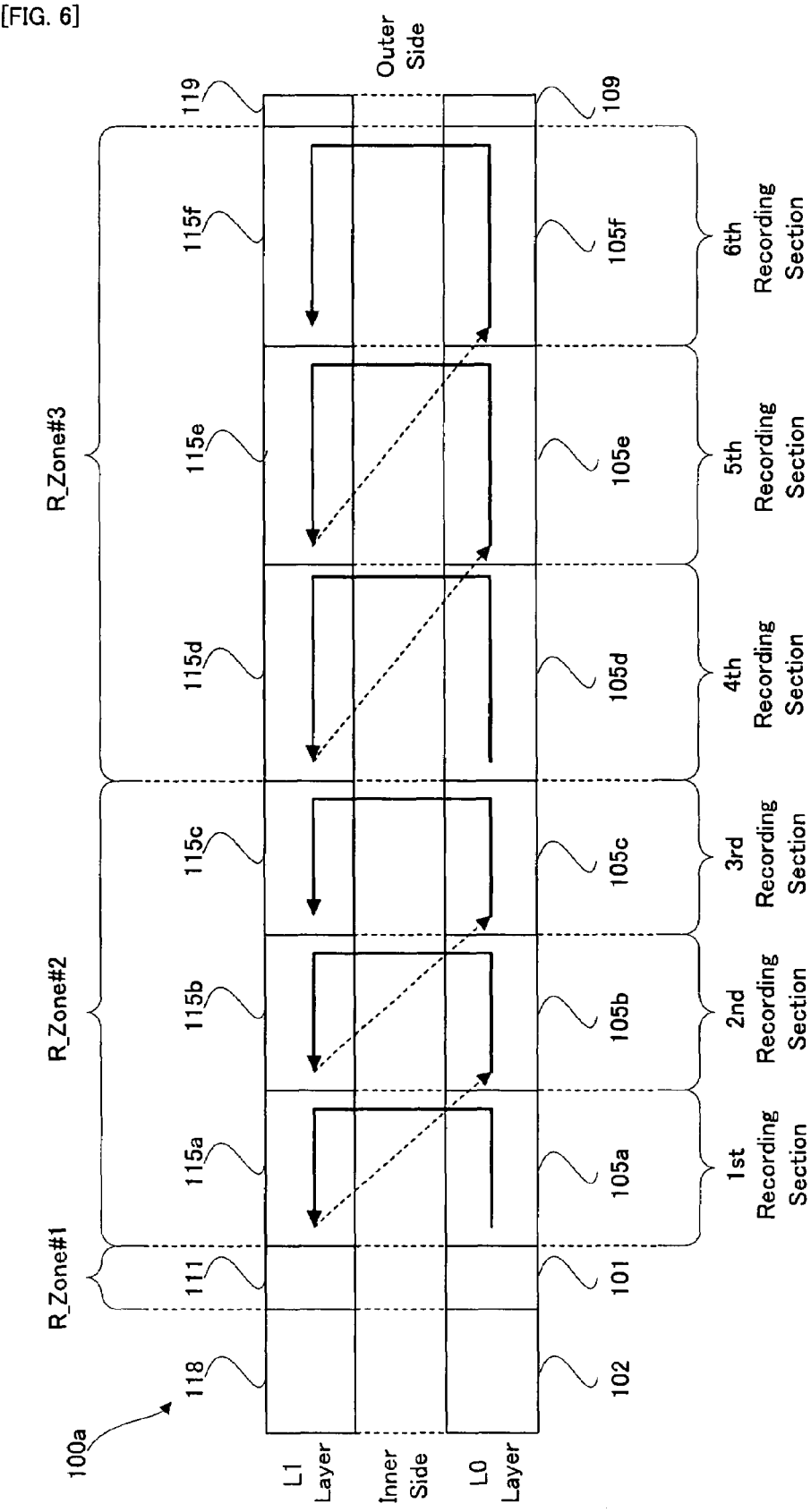
[FIG. 6]

[FIG. 7]
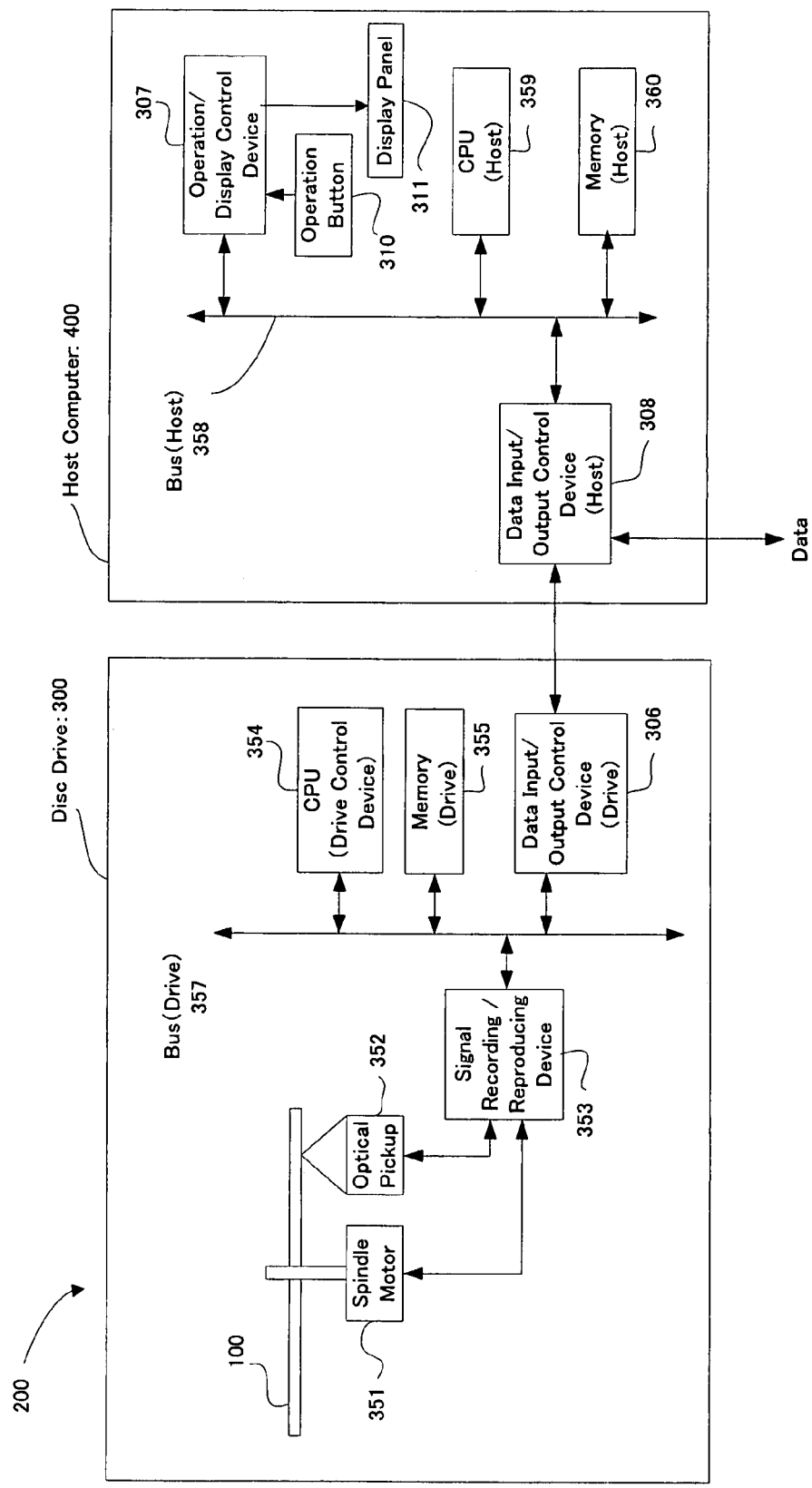

[FIG. 8]
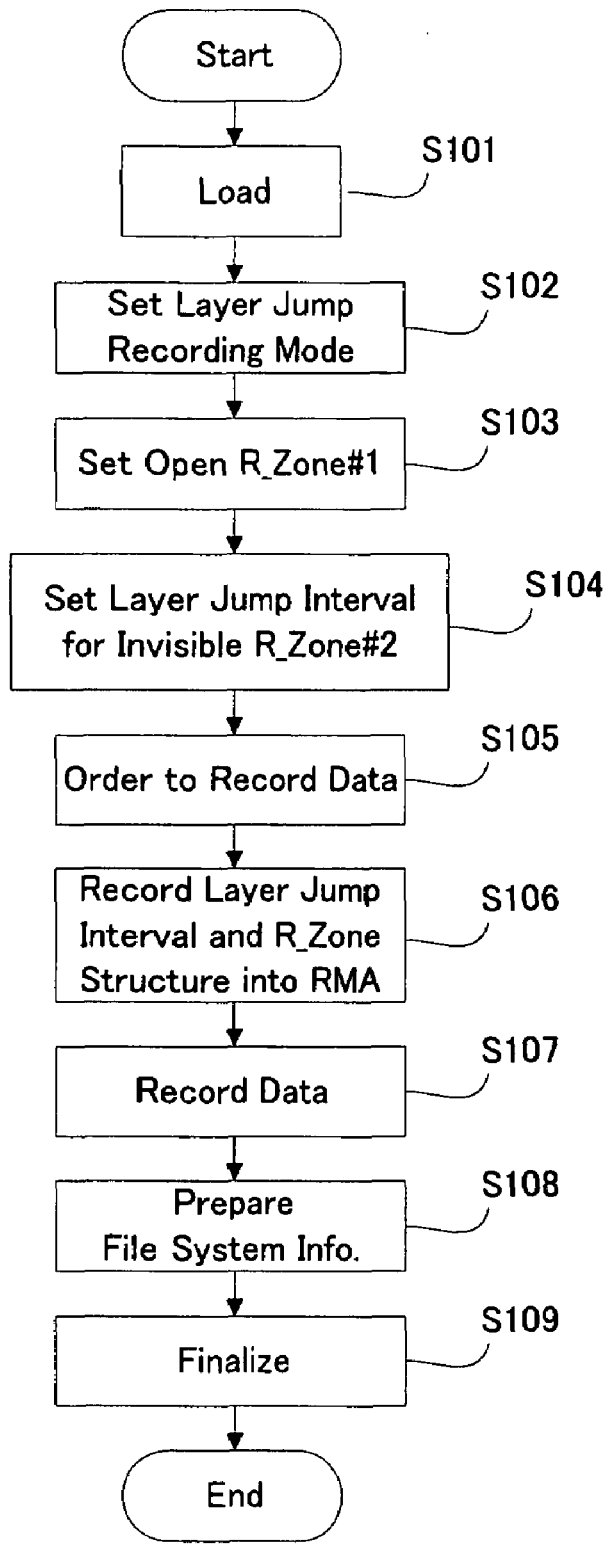

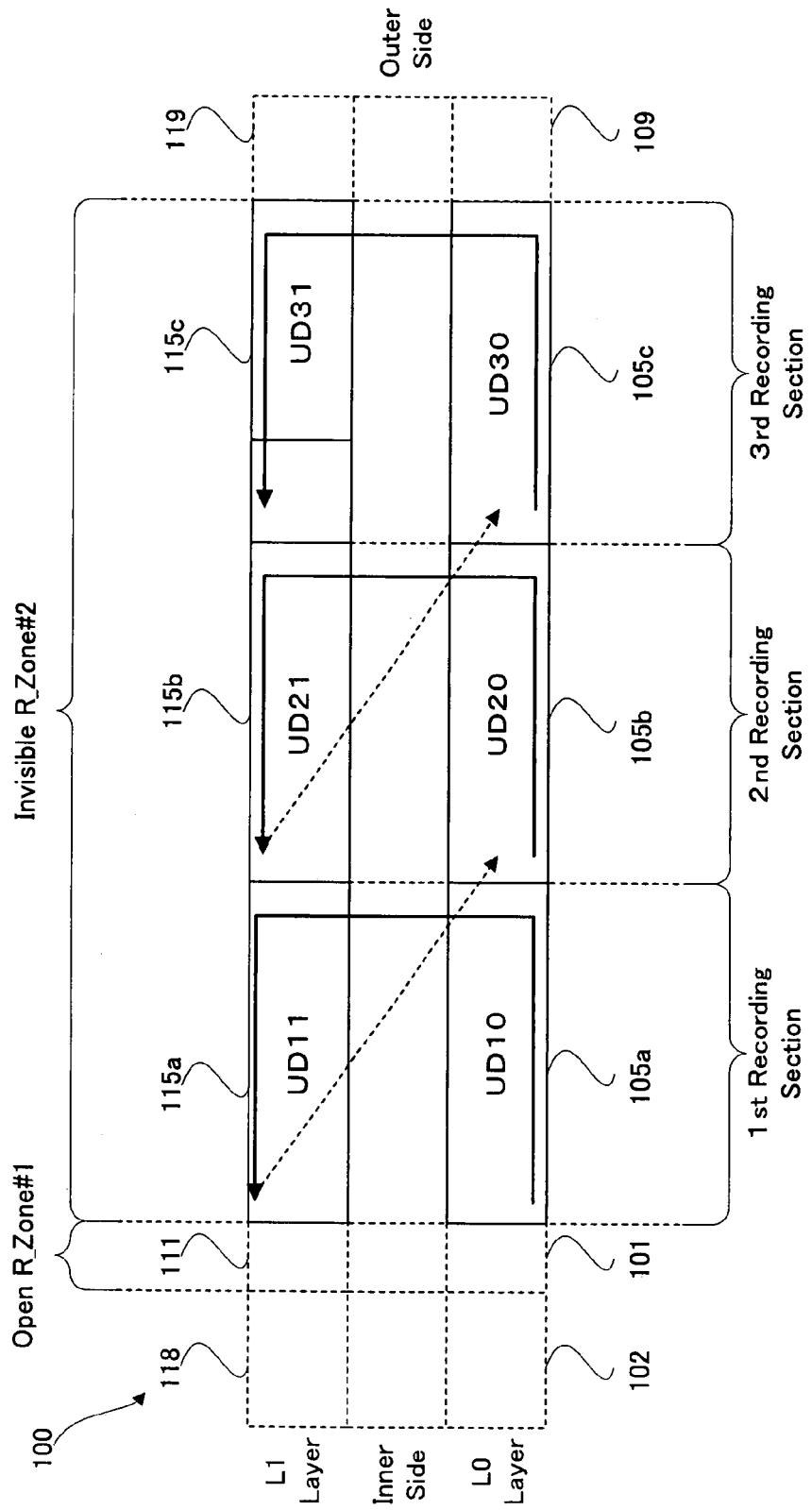
[FIG. 9]

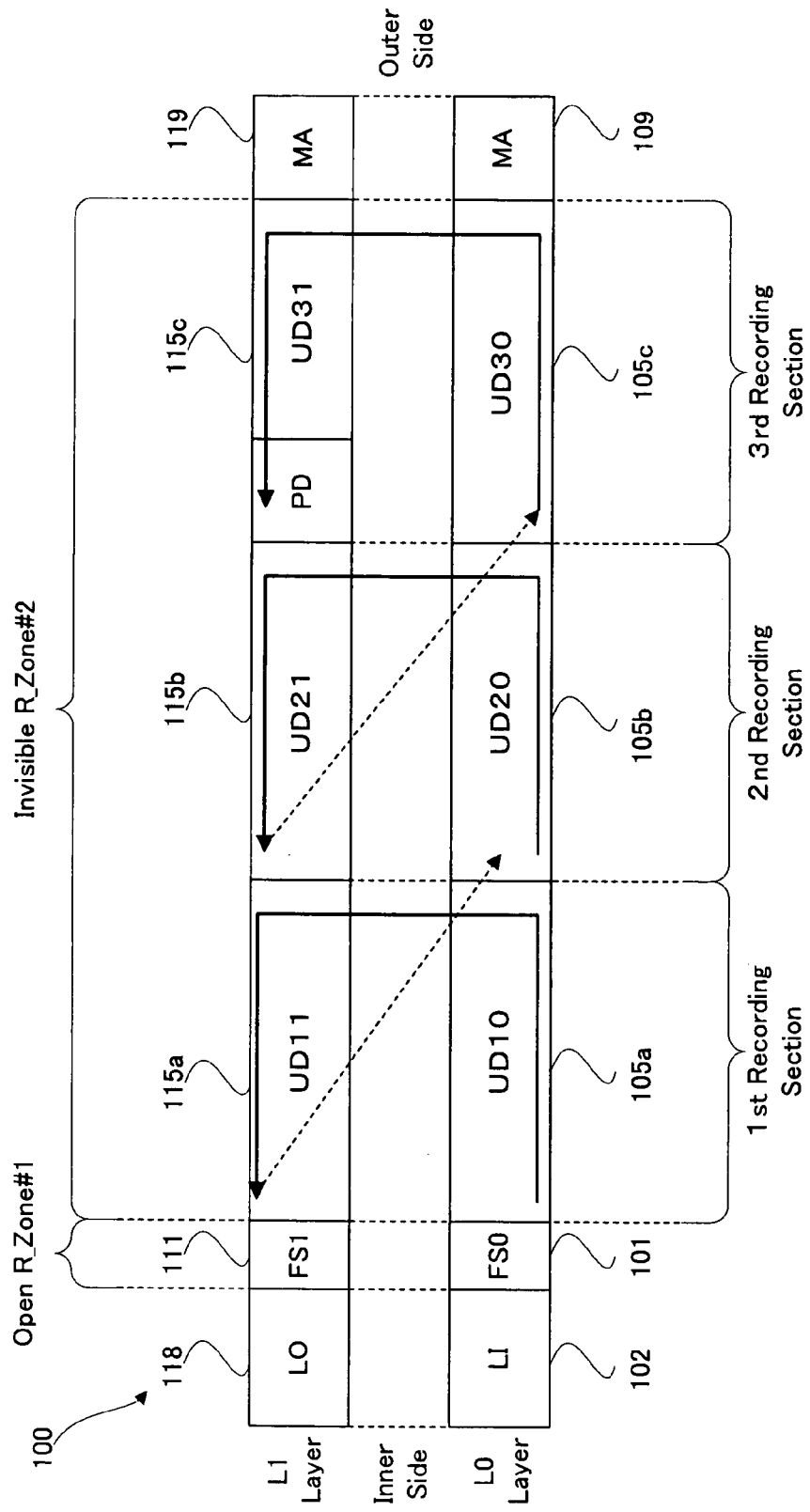
[FIG. 10]

INFORMATION RECORDING MEDIUM, INFORMATION RECORDING DEVICE AND METHOD, AND COMPUTER PROGRAM

TECHNICAL FIELD

The present invention relates to an information recording medium, such as a DVD, an information recording apparatus and method, such as a DVD recorder, and a computer program which makes a computer function as the information recording apparatus.

BACKGROUND ART

For example, in the information recording medium, such as an optical disc, like a CD-ROM (Compact Disc-Read Only Memory), a CD-R (Compact Disc-Recordable), a DVD-ROM and the like, there are developed a multi-layer type (i.e. a dual layer type optical disc, a multiple layer type, and so on), in which a plurality of recording layers are laminated on the same substrate. More specifically, such a dual layer type optical disc has a first recording layer (referred to as a "L0 layer" in this application), as the first layer, which is located on the front (i.e. a side closer to an optical pickup) as viewed from a laser light emission side in recording information by the information recording apparatus, and further has a semi-transparent reflective coating or film, located on the rear thereof (i.e. a side farther from the optical pickup). As the second recording layer, it has a second recording layer (referred to as a "L1 layer" in this application), located on the rear of the semitransparent reflective coating through a middle layer, such as an adhesive layer, and further has a reflective film located on the rear thereof. In preparing such a dual layer type information recording medium, the L0 layer and the L1 layer are individually formed and pasted in the end, to thereby prepare the two-layer type optical disc at a low cost.

In the information recording apparatus, such as a CD recorder and a DVD recorder, for recording information onto such a dual layer type optical disc, the record information is recorded into the L0 layer in a rewritable method or irreversible change recording method, such as irreversible change recording heating, by focusing the laser light for recording onto the L0 layer. The record information is recorded into the L1 layer in a rewritable method or irreversible change recording method, such as irreversible change recording heating, by focusing the laser light onto the L1 layer.

Patent document 1: Japanese Patent Application Laid Open NO. 2002-352469

DISCLOSURE OF INVENTION

Subject To Be Solved By The Invention

In such a dual layer type optical disc, generally, at first, the data is recorded into the L0 layer. After the data is recorded in the entire L0 layer, the data is recorded into the L1 layer. Therefore, there arises such a situation that the data is recorded in the entire L0 layer, while the data is recorded only in one portion of the L1 layer. If a finalize process is performed in such a situation to reproduce the data on the optical disc on an existing CD-ROM player, an existing DVD-ROM player or the like, it is necessary to record dummy data in the L1 layer in which the data is not recorded. Thus, there is a technical problem that it takes more time to perform the finalize process, as compared to the size of the data actually recorded.

Thus, a recording method, which records the record information into the L0 layer and the L1 layer alternately (or in order to substantially uniform the data size of the record information recorded into each layer), may be conceived. Adopting such recording method, however, causes a need to store a point at which a recording object or target is changed from the L0 layer to the L1 layer or from the L1 layer to the L0 layer (i.e. a layer jump point), during the recording operation. In particular, if the finalizing is not performed yet, a disc drive or a host computer, which records the data by using the disc drive, or the like needs to store the layer jump point. Without storing the layer jump point, there arises a technical problem that it is difficult or impossible to read the data recorded on the optical disc.

Thus, for example, if the disc drive stores the layer jump point, it is necessary to rewrite recording management information for managing the recording of the data, every time the data is recorded. The recording management information, however, can be rewritten only about several hundred times on a DVD, which is one specific example of an optical disc, due to the restriction of the size of the recording area to record the recording management information therein. As a result, there is such a technical problem it is impossible to continue the recording of the record information if the layer jump is performed frequently.

On the other hand, if the host computer stores the layer jump point, it stores the layer jump point, generally on a memory provided for the host computer. However, if the optical disc is ejected, the layer jump point stored on the memory is also deleted. As a result, there is such a technical problem that it is impossible to record the data onto the optical disc or that it is impossible to reproduce the data recorded on the optical disc.

It is therefore an object of the present invention to provide an information recording medium which enables the record information to be preferably recorded onto the information recording medium having a plurality of recording layers, for example, as well as an information recording apparatus and method, and a computer program which makes a computer function as the information recording apparatus.

Means For Solving The Subject (Information Recording Medium)

The above object of the present invention can be achieved by an information recording medium, provided with: a first recording layer and a second recording layer in which record information can be recorded; and a plurality of first block areas, each of which includes a recording area of a first size on the first recording layer and a recording area on the second recording layer located at a position facing the recording area of the first size on the first recording layer, and each of which is a unit by which the record information is recorded, at least one of the first recording layer and the second recording layer provided with a size area to record therein first size information which indicates the first size.

According to the information recording medium of the present invention, the record information can be recorded in each of the first recording layer and the second recording layer. The plurality of recording layers are formed in a lamination structure on one of the sides of a substrate, for example.

Particularly in the present invention, the record information is recorded into each of the first block area, which includes a recording area, having the first size, of a part of the first recording layer and a recording area of a part of the second recording layer. In particular, the recording area of a part of the first recording layer faces the recording area of a part of the second recording layer. The term "face" literally indicates the situation that the recording area of a part of the first recording layer faces the recording area of a part of the second recording layer. More specifically, it has a wide concept, including not only a case where the recording area of a part of the first recording layer strictly faces the recording area of a part of the second recording layer, namely, a case where that the former has an address with the same position relationship as the latter, but also a case where the former has an address which can be equated with that of the latter, and further including a relationship between the recording area of a part of the first recording layer and the recording area of a part of the second recording layer in consideration of an eccentricity or the like, as described later. Then, the plurality of first block areas are included in the information recording medium. In other words, the record information is recorded by the unit of first block area. If the record information is further additionally recorded, following the once ended recording operation, the record information is recorded into a new first block area. Since the record information is recorded into each of the first block areas, as described above, the record information is less likely or hardly recorded with it distributed unevenly in either the first recording layer or the second recording layer. Thus, it is possible to reduce the size of an area or eliminate the area in which the dummy data needs to be recorded in a finalize process, as compared to an information recording medium on which the record information is recorded into the second recording layer after recorded in the entire first recording layer.

Moreover, the first size is recorded as the first size information into the size area on the information recording medium. Therefore, even if an information recording apparatus itself, discussed later, does not store a point at which the recording layer targeted for recording is changed, it is possible to recognize the plurality of first block areas, relatively easily. Namely, it is possible to preferably recognize a unit in which the first block area is changed and a point at which the recording layer targeted for recording is changed. Since the recording area of a part of the first recording layer constituting each of the first block areas has the same or substantially the same size, it is enough if the first size information is recorded once. In other words, it is unnecessary to record the first size information every time the recording layer targeted for recording is changed, which does not cause such a disadvantage that there is no more recording area in which the first size information can be recorded. Thus, it is possible to preferably continue the recording operation. Even if the information recording medium is ejected from an information recording apparatus before the finalize process, it is possible to preferably recognize a data structure on information recording medium (specially, the structures of the plurality of first block areas), by referring to the first size information recorded in the size area, especially even in the case where the record information is alternately recorded in respective recording layers. Therefore, on the basis of the recognized structure, it is possible to preferably continue the recording operation.

Consequently, according to the information recording medium of the present invention, it is possible to reduce a time length required for the finalize process, and it is also possible to preferably recognize a structure of how the record information is recorded, even if the record information is recorded into each recording layer. Thus, it is possible to preferably record the record information.

In one aspect of the information recording medium of the present invention, the recording area on the second recording layer located at the position facing the recording area of the first size on the first recording layer has substantially the first size.

According to this aspect, the size of the recording area of a part of the second recording layer constituting the first block area is the same or substantially the same as the first size. In other words, the recording area of a part of the first recording layer and the recording area of a part of the second recording layer, which constitute the first block area, have the same or substantially the same size. Therefore, it is possible to substantially uniform the size of the record information recorded into the first recording layer and the size of the record information recorded into the second recording layer. Thus, it is possible to reduce the size of an area or eliminate the area in which the dummy data needs to be recorded in the finalize process.

In another aspect of the information recording medium of the present invention, it includes a plurality of second block areas, each of which includes a recording area of a second size, which is different from the first size, on the first recording layer and a recording area on the second recording layer located at a position facing the recording area of the second size on the first recording layer, and each of which is a unit by which the record information is recorded.

According to this aspect, even if the record information is not recorded into the first block areas, all of which have the same size, throughout the entire information recording medium, it is possible to record the record information into the second block areas, each of which is provided with a recording area having the second size, different from the first size which is the size of the recording area of a part of the first recording layer constituting the first block area. Therefore, it is possible to perform the recording operation, more flexibly, in accordance with features, such as the type and the size of the record information to be recorded.

Then, the second block area has the same structure as that of the first block area, so that it is possible to receive the above-mentioned various benefits.

In an aspect of the information recording medium including the second block areas, as described above, the recording area on the second recording layer located at the position fading the recording area of the second size on the first recording layer may have substantially the second size.

By virtue of such construction, the size of the recording area of a part of the second recording layer constituting the second block area is the same or substantially the same as the second size. In other words, the recording area of a part of the first recording layer and the recording area of a part of the second recording layer, which constitute the second block area, have the same or substantially the same size. Therefore, it is possible to substantially uniform the size of the record information recorded into the first recording layer and the size of the record information recorded into the second recording layer. Thus, it is possible to reduce the size of an area or eliminate the area in which the dummy data needs to be recorded in the finalize process.

In an aspect of the information recording medium including the second block areas, as described above, second size information which indicates the second size may be further recorded into the size area.

By virtue of such construction, even in the second block area, the second size information is recorded, as in the first size information of the first block area. Therefore, it is possible to recognize the structure of the second block area, relatively easily and preferably, by referring to the second size information.

In another aspect of the information recording medium of the present invention, the size area is included in a recording management area into which recording management information for managing recording of the record information is recorded.

By virtue of such construction, the first size information (and furthermore, the second size information) is recorded into the size area included in the recording management area into which the recording management information for managing the recording of the record information is recorded. Thus, even in the middle of the recording operation, it is possible to preferably recognize a state on the information recording medium. As a result, it is possible to preferably record the record information.

(Information Recording Apparatus and Method)

The above object of the present invention can be also achieved by an information recording apparatus, provided with: a recording device for recording record information onto an information recording medium, provided with a first recording layer and a second recording layer in which the record information can be recorded; a first controlling device for controlling the recording device to record the record information by a unit of a first block area which includes a recording area of a first size on the first recording layer and a recording area on the second recording layer located at a position facing the recording area of the first size on the first recording layer; and a second controlling device for controlling the recording device to record first size information which indicates the first size, as the record information, into at least one of the first recording layer and the second recording layer.

According to the information recording apparatus of the present invention, by virtue of the operation of the recording device, it is possible to record the record information into the first recording layer and the second recording layer. Particularly in the present invention, by virtue of the operation of the first controlling device, the recording device is controlled to record the record information by the unit of the first block area which includes a recording area having the first size of a part of the first recording layer and a recording area of a part of the second recording layer. Thus, the record information is less likely or hardly recorded with it unevenly distributed in either the first recording layer or the second recording layer. Thus, it is possible to reduce the size of an area or eliminate the area in which the dummy data needs to be recorded in the finalize process, as compared to an information recording medium on which the record information is recorded into the second recording layer after recorded in the entire first recording layer. By this, it is possible to reduce a time length required for the finalizing, which causes a great advantage that it is possible to improve the efficiency of the recording operation.

Moreover, since the record information is recorded into each of the first block areas, even if the additional recording of the record information is repeated, the record information is less likely or hardly recorded with it unevenly distributed in either the first recording layer or the second recording layer. Thus, even if the record information is recorded once or even if the record information is additionally recorded, it is possible to receive the above-mentioned various benefits.

Moreover, by virtue of the operation of the second controlling device, the first size is recorded as the first size information onto the information recording medium. Therefore, even if the information recording apparatus itself does not store a point at which the recording layer targeted for recording is changed, it is possible to recognize the plurality of first block areas, relatively easily. Namely, it is possible to preferably recognize a unit in which the first block area is changed and a point at which the recording layer targeted for recording is changed. Since the recording area of a part of the first recording layer constituting each of the first block areas has the same or substantially the same size, it is enough if the first size information is recorded once. In other words, it is unnecessary to record the first size information every time the recording layer targeted for recording is changed, which does not cause such a disadvantage that there is no more recording area in which the first size information can be recorded. Thus, it is possible to preferably continue the recording operation. Even if the information recording medium is ejected from the information recording apparatus before the finalize process, it is possible to preferably recognize the data structure on information recording medium (specially, the structures of the plurality of first block areas), by referring to the first size information recorded in the size area, even in the case where the record information is alternately recorded in respective recording layers. Therefore, on the basis of the recognized structure, it is possible to preferably continue the recording operation.

Consequently, according to the information recording apparatus of the present invention, it is possible to reduce a time length required for the finalize process, and it is also possible to preferably recognize a structure of how the record information is recorded, even if the record information is recorded into each recording layer. Thus, it is possible to preferably record the record information.

Incidentally, in response to the various aspects of the information recording medium of the present invention described above, the information recording apparatus of the present invention can adopt various aspects.

In one aspect of the information recording apparatus of the present invention, the first controlling device controls the recording device to record the record information by the unit of the first block area in which the recording area on the second recording layer located at the position facing the recording area of the first size on the first recording layer has substantially the first size.

According to this aspect, by virtue of the operation of the first controlling device, the record information is recorded by the unit of the first block area including the recording area having the first size of a part of the second recording layer. In other words, the record information is recorded such that the recording area of a part of the first recording layer and the recording area of a part of the second recording layer, which constitute the first block, have the same or substantially the same size. Therefore, it is possible to substantially uniform the size of the record information recorded into the first recording layer and the size of the record information recorded into the second recording layer. Thus, it is possible to reduce the size of an area or eliminate the area in which the dummy data needs to be recorded in the finalize process.

In another aspect of the information recording apparatus of the present invention, it is further provided with a third controlling device for controlling the recording device to record the record information by a unit of a second block area which includes a recording area of a second size, which is different from the first size, on the first recording layer and a recording area on the second recording layer located at a position facing the recording area of the second size on the first recording layer.

According to this aspect, it is unnecessary to record the record information into the first block areas, all of which have the same size, throughout the entire information recording medium. In other words, by virtue of the operation of the third controlling device, the record information is recorded into the second block areas, each of which is provided with a recording area having the second size, different from the first size which is the size of the recording area of a part of the first recording layer constituting the first block area. Therefore, it is possible to perform the recording operation, more flexibly, in accordance with features, such as the type and the size of the record information to be recorded.

Then, the second block area has the same structure as that of the first block area, so that it is possible to receive the above-mentioned various benefits.

In an aspect of the information recording apparatus provided with the third controlling device, as described above, the third controlling device may control the recording device to record the record information by the unit of the second block area in which the recording area on the second recording layer located at the position facing the recording area of the second size on the first recording layer has substantially the second size.

According to this aspect, by virtue of the operation of the third controlling device, the record information is recorded by the unit of the second block area including the recording area having the second size of a part of the second recording layer. In other words, the record information is recorded such that the recording area of a part of the first recording layer and the recording area of a part of the second recording layer, which constitute the second block area, have the same or substantially the same size. Therefore, it is possible to substantially uniform the size of the record information recorded into the first recording layer and the size of the record information recorded into the second recording layer. Thus, it is possible to reduce the size of an area or eliminate the area in which the dummy data needs to be recorded in the finalize process.

In an aspect of the information recording apparatus provided with the third controlling device, as described above, the second controlling device may control the recording device to record second size information which indicates the second size, as the record information.

By virtue of such construction, even in the second block area, the second size information is recorded, as in the first size information of the first block area, by the operation of the second controlling device. Therefore, it is possible to recognize the structure of the second block area, relatively easily and preferably, by referring to the second size information.

In another aspect of the information recording apparatus of the present invention, the first controlling device controls the recording device to record the record information by the unit of the first block area, by performing a layer jump, which is to change the recording layer targeted to record the record information, for each first size.

According to this aspect, it is possible to preferably control the operation of the layer jump, and it is possible to preferably record the record information by the unit of the first block area (or the second block area).

Incidentally, by performing the layer jump, the recording layer targeted to record the record information therein is changed from the first recording layer to the second recording layer, or from the second recording layer to the first recording layer. For example, the recording target of the recording information is changed to the recording area of the second recording layer facing the recording area of the first recording layer which is the previous recording target immediately before the layer jump.

In another aspect of the information recording apparatus of the present invention, the second controlling device controls the recording device to record the first size information into a recording management area into which recording management information for managing recording of the record information is recorded.

According to this aspect, the first size information (or the second size information) is recorded into the recording management area into which the recording management information for managing the recording of the record information is recorded. Thus, even in the middle of the recording operation, it is possible to preferably recognize a state on the information recording medium. As a result, it is possible to preferably record the record information.

In another aspect of the information recording apparatus of the present invention, it is further provided with a preparing device for preparing control information (e.g. file system information) to control at least one of recording and reproduction of the record information, on the basis of at least one of the first size information and the second size information.

According to this aspect, it is possible to recognize the data structure (particularly, a structure relating to a point at which the recording layer targeted for recording is changed) of the first block area (or second block area) indicated by the first size information (or second size information), relatively easily. Therefore, it is possible to prepare the control information, relatively easily.

The above object of the present invention can be also achieved by an information recording method in an information recording apparatus, provided with: a recording device for recording record information onto an information recording medium, provided with a first recording layer and a second recording layer in which the record information can be recorded, the information recording method provided with: a first controlling process of controlling the recording device to record the record information by a unit of a first block area which includes a recording area of a first size on the first recording layer and a recording area on the second recording layer located at a position facing the recording area of the first size on the first recording layer; and a second controlling process of controlling the recording device to record first size information which indicates the first size, as the record information, into at least one of the first recording layer and the second recording layer.

According to the information recording method of the present invention, it is possible to receive the same various benefits as those of the above-mentioned information recording apparatus of the present invention.

Incidentally, in response to the various aspects of the information recording apparatus of the present invention described above, the information recording method of the present invention can adopt various aspects.

(Computer Program)

The above object of the present invention can be also achieved by a computer program for recording control to control a computer provided in above-mentioned information recording apparatus of the present invention (including its various aspects), to make the computer function as at least one of the first controlling device and the second controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the first controlling device and the second controlling device.

According to the computer program product of the present invention, the above-described information recording apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may be provided with computer readable instructions for causing the computer) to function as the above-described information recording apparatus.

These effects and other advantages of the present invention will become more apparent from the following embodiments.

As explained above, the information recording medium of the present invention includes the plurality of block areas, each of which includes a part of the first recording layer having the first size and a part of the second recording layer, and is provided with the size area to record therein the size information which indicates the first size. Therefore, it is possible to reduce a time length required for the finalize process, and it is also possible to preferably record the record information even if the record information is recorded into each recording layer.

Moreover, the information recording apparatus of the present invention is provided with the recording device, the first controlling device, and the second controlling device. The information recording method of the present invention is provided with the first controlling process and the second controlling process. Therefore, it is possible to reduce a time length required for the finalize process, and it is also possible to preferably record the record information even if the record information is recorded into each recording layer.

BRIEF DESCRIPTION OF DRAWINGS

[FIG. 1] FIG. 1(a) and FIG. 1(b) are a substantial plan view showing the basic structure of an optical disc having a plurality of recording areas in an embodiment of an information recording medium of the present invention (FIG. 1(a)), and a schematic cross sectional view of the optical disc and a corresponding conceptual diagram showing a recording area structure in the radial direction (FIG. 1(b)).

[FIG. 2] FIG. 2 is an explanatory diagram conceptually showing an aspect of the recording of data onto the optical disc in the embodiment.

[FIG. 3] FIG. 3 is a data structural view conceptually showing the data structure of RMD (Recording Management Data) including data, such as a layer jump interval, to be recorded into a RMA.

[FIG. 4] FIG. 4 is a data structural view conceptually showing a recording aspect of recording the data so as to include a plurality of recording sections in one border area.

[FIG. 5] FIG. 5 is a data structural view conceptually showing a recording aspect of recording the data so as to associate one recording section with one border area.

[FIG. 6] FIG. 6 is a data structural view showing an optical disc provided with a plurality of R_Zones on a user data area.

[FIG. 7] FIG. 7 is a block diagram conceptually showing the basic structure of an embodiment of an information recording apparatus of the present invention.

[FIG. 8] FIG. 8 is a flowchart conceptually showing an entire flow of the recording operation of an information recording/reproducing apparatus in the embodiment.

[FIG. 9] FIG. 9 is a data structural view showing one procedure of the recording operation.

[FIG. 10] FIG. 10 is a data structural view showing another procedure of the recording operation.

DESCRIPTION OF REFERENCE CODES

100, 100a optical disc
101, 111 file system
102 lead-in area
103, 113 PCA
104, 114 RMA
105, 115 user data area
106, 116 border-in area
107, 117 border-out area
118 lead-out area
109, 119 middle area
121 layer jump interval
200 information recording/reproducing apparatus
300 disc drive
352 optical pickup
354 CPU
359 CPU
400 host computer

BEST MODE FOR CARRYING OUT THE INVENTION

Hereinafter, the best mode for carrying out the invention will be explained in order in each embodiment with reference to the drawings.

Hereinafter, embodiments of the present invention will be explained with reference to the drawings.

Embodiment of the Information Recording Medium

At first, with reference to FIG. 1 to FIG. 6, an embodiment according to the information recording medium of the present invention will be discussed.

At first, with reference to FIG. 1(a) and FIG. 1(b), the basic structure of an optical disc in the embodiment of the recording medium of the present invention will be discussed. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 102 and a lead-out area 118; user data areas 105 and 115; and middle areas 109 and 119, with a center hole 101 as the center. Then, for example, on a transparent substrate 110 of the optical disc 100, there are laminated recording layers and the like. In each recording area of the recording layers, tracks, such as groove tracks and land tracks, are alternately placed, spirally or concentrically, with the center hole 101 as the center. On the track, data is divided and recorded by a unit of ECC block. The ECC block is a data management unit by a pre-format address in which record information is error-correctable.

Incidentally, the present invention is not particularly limited to the optical disc having these three areas. For example, even if the lead-in area 102, the lead-out area 118 or the middle area 109 (or 119) does not exist, a data structure explained below can be constructed. Moreover, as described later, the lead-in area 102, the lead-out area 118 or the middle area 109 (or 119) may be further segmentized.

Particularly, the optical disc 100 in the embodiment, as shown in FIG. 1(b), has such a structure that a L0 layer which constitutes one example of the "first recording layer" of the present invention and a L1 layer which constitutes one example of the "second recording layer" of the present invention are laminated on the transparent substrate 110. Upon the recording and reproduction of such a two-layer type optical disc 100, the recording and reproduction in the L0 layer or the L1 layer is performed, depending on which recording layer has the focus position of laser light LB, irradiated from the lower to upper side in FIG. 1(b). In particular, the data is recorded from the inner to the outer side in the L0 layer, and the data is recorded from the outer to the inner side in the L1 layer. In other words, the optical disc 100 in the embodiment corresponds to an optical disc in an opposite track path manner. However, even an optical disc in a parallel track path manner can receive various benefits described later, by adopting the structure discussed below.

Moreover, the optical disc 100 in the embodiment is provided with: PCAs (Power Calibration Areas) 103 and 113; and RMAs (Recording Management Areas) 104 and 114, on the inner side of each of the lead-in area 102 and the lead-out area 118.

The PCAs 103 and 113 are recording areas to perform an OPC (Optimum Power Control) process of adjusting (i.e. calibrating) the laser power of laser light LB in recording the data onto the optical disc 100. An OPC pattern is recorded into the PCAs 103 and 113 with changing the laser power gradually, and the reproduction quality (e.g. asymmetry, etc.) of the recorded OPC pattern is measured, to thereby calculate an optimum laser power in recording the data.

The RMAs 104 and 114 are recording areas to record therein various management information for managing the recording of the data onto the optical disc 100.

Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Next, with reference to FIG. 2, an aspect of the recording of data onto the optical disc 100 in the embodiment will be discussed in more details. FIG. 2 is an explanatory diagram conceptually showing the aspect of the recording of the data onto the optical disc 100 in the embodiment.

As shown in FIG. 2, the optical disc 100 has two recording layers (i.e. the L0 layer and the L1 layer). The L0 layer is provided with: the lead-in area 102; and the middle area 109. The L1 layer is provided with: the lead-out area 118; and the middle area 119. Moreover, file system information 101 is recorded between the user data area 105 and the lead-in area 102, and file system information 111 is recorded between the lead-out area 118 and the user data area 115. Then, in the embodiment, the recording areas in which the file system information 101 and 111 is recorded are assigned as an R_Zone (Record Zone) #1. Moreover, the user data areas 105 and 115 are assigned as an R_Zone #2.

In particular, in the optical disc in the embodiment, there are a plurality of recording sections (one specific example of the "first block area" and the "second block area" of the present invention) in the user data areas 105 and 115 in the L0 layer and the L1 layer, respectively. Each recording section is provided with a partial user data area 105a, 105b, or 105c, and a partial user data area 115a, 115b, or 115c, which constitutes one portion of the user data area 105 or 115. For example, a first recording section is provided with the partial user data area 105a and the partial user data area 115a which faces the partial user data area 105a. A second recording section is provided with the partial user data area 105b and the partial user data area 115b which faces the partial user data area 105b. A third recording section is provided with the partial user data area 105c and the partial user data area 115c which faces the partial user data area 105c. In this case, for example, the partial user data area 105a and the partial user data area 115a may have the same position relationship as viewed from the irradiation or emission side of laser light LB. In other words, since the optical disc 100 is in the opposite track path manner, the address value of the partial user data area 105a and the address value of the partial user data area 115a may have a complement relationship with each other. However, even if the partial user data area 105a and the facing partial user data area 115a do not have the same position relationship, strictly, as viewed from the irradiation side of the laser light LB, they may have a position relationship which can be substantially equated as the same position relationship. Alternatively, if they have a position relationship which does not influence the recording operation and the reproduction operation, some discrepancy or mismatch is more or less allowed.

Then, content data, such as movie data and audio data, and other various data are recorded by a unit of the recording section. In other words, for example, some movie data (or file) is recorded into the first recording section. For example, some audio data (or file) is recorded into the second recording section. For example, some data for PC (or file) is recorded into the third recording section. In particular, the data is firstly recorded into the first recording section, the data is secondly recorded into the second recording section, and the data is thirdly recorded into the third recording section. Then, since the optical disc 100 in the embodiment is in the opposite track path manner, the data is recorded from the inner circumferential side to the outer circumferential side in the L0 layer in respective recording sections. On the other hand, the data is recorded from the outer circumferential side to the inner circumferential side in the L1 layer in respective recording sections. In other words, the data is recorded in a direction shown with arrows in FIG. 2.

Moreover, some single data (file) may be recorded over a plurality of recording sections. In other words, one portion of the single data may be recorded into the entire first recording section, and then, the rest of the single data may be recorded into at least one portion of the second recording section. In short, the data may be recorded by the unit of recording section, from the first recording section, in order.

Particularly in the embodiment, the plurality of recording sections have the same or substantially the same size. Discussing this in more detail, the partial user data areas 105a, 105*b*, and 105*c* of the L0 layer in the plurality of recording sections have the same or substantially the same size. Moreover, the partial user data areas 115*a*, 115*b*, and 115*c* of the L1 layer in the plurality of recording sections have the same or substantially the same size. Since the partial user data area 105*a* (or 105*b* or 105*c*) of the L0 layer and the partial user data area 115*a* (or 115*b* or 115*c*) of the L0 layer, which face each other, constitute one recording section, the partial user data area 105*a* (or 105*b* or 105*c*) of the L0 layer and the partial user data area 115*a* (or 115*b* or 115*c*) of the L0 layer, which face each other, have the same or substantially the same size. In other words, a layer jump operation of changing the recording layer, which is targeted to record the data, from the L0 layer to the L1 layer is performed at regular intervals.

The size of each recording section in the L0 layer and the L1 layer (i.e. which is the size of each of the partial user data areas 105*a*, 105*b*, 105*c*, 115*a*, 115*b*, and 115*c*, and which is an interval at which the layer jump operation is performed) is recorded in the RMA 104 (or 114), as the "layer jump interval" which constitutes one specific example of the "first size information" and the "second size information" of the present invention. The "layer jump interval" will be discussed in more detail, with reference to FIG. 3. FIG. 3 is a data structural view conceptually showing the data structure of RMD (Recording Management Data) including data, such as the layer jump interval, to be recorded into the RMA 104 (or 114).

As shown in FIG. 3, a layer jump interval 121 is recorded in the RMA 104 (or 114). Discussing the format of a DVD, which is one specific example of the optical disc 100, as an example, the layer jump interval 121 is recorded in a recording area with byte positions of "14" to "15" in a field 3 of the RMD in a format 4 recorded in the RMA 104 (or 114). Namely, the recording area with byte positions of "14" to "15" constitutes one specific example of the "size area" of the present invention.

The layer jump interval 121 is data having a size of 2 bytes, and indicates the size of each of the partial user data areas 105*a*, 105*b*, 105*c*, 115*a*, 115*b*, and 115*c* in respective recording sections (i.e. the interval at which the layer jump operation is performed). For example, if the layer jump interval 121 indicates a size corresponding to 1000 ECC blocks, the size of each of the partial user data areas 105*a*, 105*b*, 105*c*, 115*a*, 115*b*, and 115*c* in respective recording sections is 1000 ECC blocks. Then, the layer jump operation is performed every time the data of 1000 ECC blocks is recorded.

Incidentally, the field 3 of the RMD has recorded various data in addition to the layer jump interval 121. For example, the data which indicates an invisible R_Zone number is recorded in a recording area with byte positions of "0" to "1". The data which indicates a first open R_Zone number is recorded in a recording area with byte positions of "2" to "3". The data which indicates a second open R_Zone number is recorded in a recording area with byte positions of "4" to "5". The data which indicates the start sector number of the R_Zone #1 is recorded in a recording area with byte positions of "16" to "19". The data which indicates the layer jump address of the R_Zone #1 is recorded in a recording area with byte positions of "20" to "23". The data which indicates the end sector number of the R_Zone #1 is recorded in a recording area with byte positions of "24" to "27". The data which indicates the last recorded address of the R_Zone #1 is recorded in a recording area with byte positions of "28" to "31". The data which indicates the start sector number of the R_Zone #2 is recorded in a recording area with byte positions of "32" to "35". After this, the data which indicates the layer jump address, the end sector number, the last recorded address or the like is recorded even for the R_Zone #2, as in the R_Zone #1. Moreover, if there are R_Zones #3, #4, and the like, the same data is recorded, even for the R_Zones #3, #4, and the like.

Moreover, a recording area with byte positions of "6" to "13" is ensured as a reserved area used for function enhancement in the future.

As described above, in such construction that the data is recorded into each of the plurality of recording sections, it is possible to sequentially record the data from the inner circumferential side in each of the L0 layer and the L1 layer. Thus, there is an advantage that in the finalize process of the optical disc, a time length required for the process is relatively reduced. In particular, in the case of the optical disc in such an aspect that the data is recorded into the L1 layer after recorded into the whole L0 layer, there is such a technical problem that it takes relatively longer time to finalize, as compared to the amount of data recorded on the whole optical disc, because the data is recorded in the whole L0 layer and the data is hardly recorded in the L1 layer. This is because it needs a time length to record the dummy data into an area in which the data is not recorded in the L1 layer. However, according to the embodiment, the various data is recorded in each recording section, so that it is possible to record the data, substantially uniformly, into each of the L0 layer and the L1 layer. Therefore, it is unnecessary to record the dummy data in the L1 layer, as described above. In other words, on the outer circumferential side of the middle areas 109 and 119, an unrecorded state (or mirror state) will be admissible. Thus, it is possible to reduce the time length for the finalize process, so that it is possible to contribute the reduction of a recording operation time and the improvement of the comfortableness of a user, and the like.

Since each recording section has the same or substantially the same size, it is possible to recognize each recording section even if a disc drive and a host computer or the like, described later, do not store therein a point at which the recording layer targeted for recording is changed (i.e. a layer jump point). Moreover, since each recording section has the same or substantially the same size, it is enough if the layer jump interval 121 is recorded into the RMA 104 (or 114) once. In other words, it is unnecessary to record the RMD every time the recording layer targeted for recording is changed, which does not cause a disadvantage that there is no more recordable recording area out of the RMA 104 (or 114). Thus, it is possible to continue the recording operation.

Then, even if the optical disc 100 is ejected from the disc drive before the finalize process, it is possible to preferably recognize a data structure on the optical disc 100 (specially, the structure of each recording section), by referring to the layer jump interval 121 recorded in the RMA 104 (or 114), even in the case where the data is alternately recorded in respective recording layers. Namely, it is possible to obtain the size of each recording section from the layer jump interval 121, so that it is possible to recognize the data structure on the optical disc 100 (specially, the structure of each recording section), preferably and relatively easily, by performing a predetermined operation or calculation process.

Incidentally, with reference to FIG. 4 and FIG. 5, the more detailed data structure of the optical disc 100 in the embodiment will be discussed. Specifically, an aspect of recording the data by using a border area will be discussed. FIG. 4 is a data structural view conceptually showing a recording aspect of recording the data so as to include a plurality of recording sections in one border area. FIG. 5 is a data structural view conceptually showing a recording aspect of recording the data so as to associate one recording section with one border area.

As shown in FIG. 4, the data may be recorded so as to include a plurality of recording sections in one border area. For example, in FIG. 4, a first border area includes a first recording section and a second recording section. A second border area includes a third recording section and a fourth recording section.

Now, the first and second border areas will be discussed in more detail. The first border area is provided with: partial user data areas 105a, 105b, 115a, and 115b; and border-out areas 107a and 107a. Moreover, the second border area is provided with: border-in areas 106a and 116b; partial user data areas 105c, 105d, 115c, and 115d; and border-out areas 107b and 117b. Incidentally, the first border area is not provided with the border-in area, as in the second border area; however, an extra border-in area (or an extra border zone) included in the lead-in area 102 or the lead-out area 118 has a function as the border-in area in the first border area. By forming such a border-in area and border-out area, it is possible to reproduce the information recorded on the optical disc 100 on a multi-border-compliant information reproducing apparatus (ROM player) or the like.

The border-in areas 106 and 116 are recording areas to record therein various management information for managing the data recorded in each border area, and have a size of about several μm in the radial direction of the optical disc 100, for example.

Specifically, the newest or updated physical format information is recorded in the border-in areas 106 and 116. The newest physical format information indicates distribution information (e.g. mapping information, etc.) of the data in the corresponding border area. The newest physical format information has a size corresponding to 5 ECC blocks; however, it is not limited this size.

The border-out areas 107 and 117 are areas to record therein various control information for controlling the recording operation in recording the data into each border area and the reproduction operation in reproducing the recorded data, and have a size of about 100 μm to 500 μm in the radial direction of the optical disc 100, for example.

Specifically, an RMD copy, a stop block, a next border marker, and the like is recorded in the border-out areas 107 and 117.

The RMD copy is information for managing the recording of data, and includes the same information as the RMD recorded in the RMA 104 (or 114). The RMD copy can provide information (i.e. the RMD) for reproducing the various data recorded in the border area, for an information reproducing apparatus (ROM player) which cannot read the RMD in the RMA 104 (or 114) on a DVD-R, for example.

The stop block includes flag information having a size of 2 ECC blocks, and indicates whether or not the data is recorded after the border-out area 107 (or 117). Namely, if the information reproducing apparatus for reproducing the data recorded on the optical disc 100 judges by the stop block that the data is not recorded, it does not read the subsequent area.

The next border marker is information used by an information recording apparatus for recording the data onto the optical disc. For example, the next border marker is indicated by recording three of the data having a size of 2 ECC blocks. Specifically, if the data is further recorded following the border-out area 107 (or 117), predetermined data (e.g. "00h") is recorded as the next border marker. On the other hand, if the data is not further recorded following the border-out area 107 (or 117), the next border marker is not recorded, and the recording area of one portion of the border-out area 107 (or 117) (specifically, the recording area of the latter half of the border-out area 107 (or 117)) is in the mirror state (i.e. unrecorded).

Moreover, as shown in FIG. 5, the data may be recorded so as to include one recording section in one border area. For example, in FIG. 5, a first border area includes a first recording section, a second border area includes a second recording section, and a third border area includes a third recording section. The first border area, the second border area and the third border area in FIG. 5 also have the same data structure as those of the first and second border areas shown in FIG. 4. In other words, the border-in areas 106 and 116, and the border-out areas 107 and 117 are provided.

Incidentally, the border-out areas 107 and 117 are disposed in the L0 layer and the L1 layer, respectively, at a point where the recording layer targeted to record the data therein is changed from the L0 layer to the L1 layer. By providing the border-out areas 107 and 117 at this point, it is possible to prevent a penetration (i.e. a flying-over) of an optical pickup (or the penetration of the laser light irradiated from the optical pickup) which searches for a predetermined recording position on the optical disc 100. The "penetration" herein indicates that in the case where the optical disc 100 is provided only with the first border area, when the partial user data area 105a is searched, the search destination jumps out of the partial user data area 105a into a recording area in which the data is unrecorded (e.g. the mirror area). This type of penetration of the optical pickup may cause the runaway of the subsequent recording operation and reproduction operation, which is not preferable. However, according to the embodiment, since the border-out areas 107 and 117 are provided, it is possible to properly prevent the penetration. In addition, by virtue of the border-out areas 107 and 117, it is possible to prevent the laser light from entering a recording area in which the data is unrecorded, after layer jump, which is caused by a discrepancy in pasting and an eccentricity between the two recording layers, or which is cause by a discrepancy of the irradiation position of the laser light, in performing the "layer jump" which is a change operation of changing the recording layer targeted for recording, between the L0 layer and the L1 layer.

Moreover, in consideration of the eccentricity and the like, for example, it may be constructed to make the size of the partial user data area 105a in the L0 layer larger than the size of the partial user data area 115a in the L1 layer. Particularly, it is preferable to make the size of the partial user data area 105a in the L0 layer larger than the size of the partial user data area 115a in the L1 layer so that the partial user data area 115a in the L1 layer is disposed only at a position facing the partial user data area 105a in the L0 layer. By this, if the data is recorded into the L1 layer, the laser light can be always irradiated through the L0 layer in which the data is recorded, so that it is possible to improve recording features. Obviously, the same is true for the other partial user data areas 105b, 105c, 105d, 115b, 115c, 115d, or the like.

Moreover, in the aspect of recording the data by using the border area, as shown in FIG. 4 and FIG. 5, the R_Zone to which the partial user data area included in one border area belongs and the R_Zone to which the partial userdata area included in another border area belongs are different. In other words, in FIG. 4, the partial user data areas 105a and 115a included in the first border area belong to an R_Zone #2. The partial user data areas 105b and 115b included in the second border area belong to an R_Zone #3. In FIG. 5, the partial user data areas 105a and 115a included in the first border area belong to an R_Zone #2. The partial user data areas 105b and 115b included in the second border area belong to an R_Zone

3. The partial user data areas 105c and 115c included in the third border area belong to an R_Zone #4. More R_Zones may be provided on the user data areas 105 and 115. Obviously, it is not limited to the aspect of recording the data by using the border area, but the aspect of recording the data by using more R_Zones may be admissible. An aspect of providing the plurality of R_Zones will be discussed in more detail, with reference to FIG. 6. FIG. 6 is a data structural view showing an optical disc 100a provided with a plurality of R_Zones on the user data areas 105 and 115.

As shown in FIG. 6, on the user data areas 105 and 115, two R_Zone #2 and R_Zone #3 may be assigned. In this case, the recording sections in the R_Zone #2 and the recording sections in the R_Zone #3 do not necessarily have the same or substantially the same size. Namely, the partial user data area 105a (105b, 105c, 115a, 115b, or 115c) in the R_Zone #2 and the partial user data area 105d (105e, 105f, 115d, 115e, or 115f) in the R_Zone #3 do not necessarily have the same or substantially the same size. However, the first recording section and the second recording section in the R_Zone #2 have the same or substantially the same size. The third recording section and the fourth recording section in the R_Zone #3 have the same or substantially the same size. Namely, the partial user data areas 105a, 105b, 105c, 115a, 115b, and 115c in the R_Zone #2 have the same or substantially the same size, and the partial user data areas 105f, 105e, 105f, 115d, 115e, and 115f in the R_Zone #3 have the same or substantially the same size.

In this case, both the RMD corresponding to the R_Zone #2 and the RMD corresponding to the R_Zone #3 are recorded into the RMA 104 (or 114). In other words, the layer jump interval 121 corresponding to the R_Zone #2 and the layer jump interval 121 corresponding to the R_Zone #3 are recorded into the RMA 104 (or 114).

Even in such construction, it is possible to receive the above-mentioned various benefits because each of the R_Zones has the same structure as in the above-mentioned disc 100.

Incidentally, the number of the R_Zones on the user data areas 105 and 115 is not limited to two or three, as described above, but may be more. Even in that case, it is possible to receive the above-mentioned various benefits by adopting the same structure as in the above-mentioned optical disc 100, for each of the R_Zones.

Embodiment of Information Recording/Reproducing Apparatus

Next, the structure and operation of an information recording/reproducing apparatus, which is an embodiment of the information recording apparatus of the present invention, will be explained with reference to FIG. 7 to FIG. 10.

(1) Basic Structure

At first, with reference to FIG. 7, the basic structure of an information recording/reproducing apparatus 200 in the embodiment will be discussed. FIG. 7 is a block diagram conceptually showing the basic structure of the information recording/reproducing apparatus 200 in the embodiment. Incidentally, the information recording/reproducing apparatus 200 has a function of recording the record data onto the optical disc 100 and a function of reading the record data recorded on the optical disc 100.

As shown in FIG. 7, the information recording/reproducing apparatus 200 is provided with: a disc drive 300 onto which the optical disc 100 is actually loaded; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate the optical disc 100 at a predetermined speed and stop, under spindle servo from a not-illustrated servo unit or the like.

The optical pickup 352 is one specific example of the "recording device" of the present invention. The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with a laser diode (LD) driver, a head amplifier, and so on, for example. The LD driver drives a not-illustrated semiconductor laser located in the optical pickup 352. The head amplifier amplifies the output signal of the optical pickup 352, namely, the reflected light of a light beam, and outputs the amplified signal. More specifically, the signal recording/reproducing device 353 drives the not-illustrated semiconductor laser located in the optical pickup 352 in order to determine an optimum laser power by a recording process and reproduction process for the OPC pattern, along with a not-illustrated timing generator or the like, under the control of the CPU 354, at the time of OPC process.

The memory 355 is used in the whole data processing and the OPC process on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, namely, a firmware program is stored; a buffer for temporarily storing the record reproduction data; a Random Access Memory (RAM) area into which a parameter required for the operation of a firmware program or the like is stored; and the like.

The CPU (drive control device) 354 is connected to the signal recording/reproducing device 353 and the memory 355 via the bus 357, and controls the entire disc drive 300 by giving an instruction to each constitutional element. In general, software for operating the CPU 354 or firmware is stored in the memory 355.

The data input/output control device 306 controls the input/output of the data from the exterior with respect to the disc drive 300, to thereby perform storage to and export from the data buffer on the memory 355. A drive control order, issued from the external host computer 400 which is connected with the disc drive 300 through an interface, such as a SCSI (Small Computer System Interface) and an ATAPI (AT Attachment Packet Interface), is transmitted to the CPU 354 through the data input/output control device 306. Moreover, the record/reproduction data is exchanged with the host computer 400 through the data input/output control device 306 in the same manner.

The operation/display control device 307 receives an operation instruction and performs display with respect to the host computer 400, and transmits an instruction by the operation button 310, such as an instruction to record or reproduce, to the CPU 359. The CPU 359 transmits a control command to the disc drive 300 through the data input/output control device 308 on the basis of instruction information from the operation/display control device 307 and controls the whole disc drive 300. In the same manner, the CPU 359 can transmit a command to request the host to transmit an operation state, with respect to the disc drive 300. By this, the operation state of the disc drive 300, such as during recording and during reproduction, can be recognized, so that the PCU 359 can output the operation state of the disc drive 300 to the display panel 311, such as a fluorescent tube, through the operation/display control device 307.

The memory 360 is an internal storage apparatus used by the host computer 400. The memory 360 is provided with: ROM area into which a firmware program, such as a BIOS (Basic Input/Output System), is stored; a RAM area into which parameters required for an operating system and the operation of an application program or the like are stored; and the like. Moreover, the memory 360 may be connected to an external storage apparatus, such as a not-illustrated hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360. Moreover, in another specific example, the disc drive 300 is a disc drive (hereinafter referred to as a drive), and the host computer 400 is a personal computer or a work station. The host computer, such as a personal computer, and the drive are connected through the data input/output control devices 306 and 308, such as a SCSI and an ATAPI, and application, such as writing software, installed in the host computer 400 controls the disc drive 300.

(2) Operation Principle

Next, with reference to FIG. 8 to FIG. 10, the recording operation of the information recording/reproducing apparatus 200 in the embodiment will be discussed. FIG. 8 is a flowchart conceptually showing an entire flow of the recording operation of the information recording/reproducing apparatus 200 in the embodiment. Each of FIG. 9 and FIG. 10 is a data structural view showing the procedure of the recording operation.

As shown in FIG. 8, at first, the optical disc 100 is loaded onto the disc drive 300 (step S101). At this time, it may be constructed to calculate an optimum laser power for the recording of the data by performing the OPC process by using the PCA 103 (or 113). Alternatively, it may be constructed to read various control data necessary for the recording of the data.

Then, under the control of the CPU 359, which constitutes one specific example of the "first controlling device" of the present invention, the host computer 400 sets a recording mode to a layer jump recording mode (alternate recording mode) (step S102). By setting the recording mode to the layer jump recording mode, it is possible to record the data into each recording section, as described above.

Then, the host computer 400 sets an open R_Zone #1 to record the file system information 101 (or 111), with respect to the recording area on the optical disc 100 (step S103).

Moreover, the host computer 400 sets the layer jump interval 121, with respect to an invisible R_Zone #2 which is set next to the open R_Zone #1, under the control of the CPU 359 (step S104). For example, by setting 1000 ECC blocks as the layer jump interval 121, the data is recorded to perform the layer jump by a unit of 1000 ECC blocks. In other words, the layer jump is performed every time the data is recorded in the partial user data area of 1000 ECC blocks.

Then, the host computer 400 outputs an instruction to actually record the data onto the optical disc 100, to the disc drive 300 (step S105).

The disc drive 300, receiving this instruction, records information which indicates the structures of the open R_Zone #1 and the invisible R_Zone #2 set in the step S103 etc., the layer jump interval 121 set in the step S104, and the like, into the RMA 104 (or 114) as the RMD, under the control of the CPU 354 which is one specific example of the "second controlling device" of the present invention (step S106).

Then, the data is actually recorded (step S107). In other words, the data is recorded by a unit of recording section.

For example, as shown in FIG. 9, at first, the data is recorded into the first recording section in a direction of the arrow in FIG. 9. Namely, the data (UD 10) is recorded into the partial user data area 105*a* in the first recording section, and then, the data (UD 11) is recorded into the partial user data area 115*a* in the first recording section. Then, the data is recorded into the second recording section in a direction of the arrow in FIG. 9. Namely, the data (UD 20) is recorded into the partial user data area 105*b* in the second recording section, and then, the data (UD 21) is recorded into the partial user data area 115*b* in the second recording section. Moreover, the data is recorded into the third recording section in a direction of the arrow in FIG. 9. Namely, the data (UD30) is recorded into the partial user data area 105*c* in the third recording section, and then, the data (UD31) is recorded into the partial user data area 115*c* in the third recording section. At this time, the size of each recording section (i.e. the size of each of the partial user data areas 105*a*, 105*b*, 105*c*, 115*a*, 115*b*, and 115*c* in respective recording sections) is a size indicated by the layer jump interval 121 set in the step S104 in FIG. 8. In other words, by performing the layer jump for each layer jump interval 121 set in the step S104 in FIG. 8, the data is recorded by the unit of the recording section shown in FIG. 9.

In FIG. 8 again, after the recording of the data, the host computer 400 prepares the file system information 101 (or 111) on the basis of the layer jump interval 121 or the like (step S108). The file system information 101 (or 111) includes information which indicates the data structure on the optical disc 100 (specially, the structure of each recording section, etc.) and the like. The, the prepared file system information 101 (or 111) is recorded into the open R_Zone #1 set in the step S102.

Then, the host computer 400 performs a finalize process (step S109). This finalize process is a process to allow the information recorded on the optical disc by the information recording apparatus, such as a DVD-R/RW recorder, to be reproduced by the information reproducing apparatus, such as a DVD-ROM player.

Specifically, as shown in FIG. 10, various necessary management information or the like is recorded into the lead-in area (LI) 102 and the lead-out area (LO) 118. Then, the middle areas 109 and 119 are prepared on the most outer circumferential side of the area in which the data is recorded. Into the middle areas 109 and 119, for example, the "00h" data is recorded. Moreover, since the data is not recorded in the entire partial user data area 115c in the third recording section (i.e. there is a recording area in which the data is unrecorded in the partial user data area 115c), padding data (PD) is recorded into the recording area in which the data is unrecorded. Incidentally, the padding data is "00h" data, for example. However, the padding data is not limited to this if some recording pits are formed. The same is true for the "00h" data recorded into the middle area 109 (or 119) mentioned above.

Here, if the data is recorded into the L1 layer after recorded into the entire L0 layer, it is necessary to record the dummy data into an area in which the data is unrecorded. This is a necessary process to maintain compatibility with a reproduce-only optical disc, such as a DVD-ROM. Therefore, it is assumed that 5 GB data is recorded onto an optical disc on which each of the L0 layer and the L1 layer has a recording capacity of 4 GB, 4 GB of the data is recorded into the L0 layer, and 1 GB of the data is recorded into the L1 layer. In this case, it is necessary to record the dummy data into a remaining space area with 3 GB in the L1 layer. This causes an increase in a time length required for the finalize process.

In the embodiment, however, the data is recorded, substantially uniformly, into each of the L0 layer and the L1 layer. In other words, the data is recorded until substantially the same radius position in each of the L0 layer and the L1 layer. For example, it is assumed that 5 GB data is recorded onto an optical disc on which each of the L0 layer and the L1 layer has a recording capacity of 4 GB, 2.5 GB of the data is recorded into each of the L0 layer and the L1 layer. Therefore, it is unnecessary to record the dummy data into an unrecorded area, and it is enough if the middle area is prepared in the most outer circumferential area in which the data is recorded, as described above. Thus, there is such a great advantage that it is possible to reduce the time length required for the finalize process.

Since each recording section has the same or substantially the same size, it is possible to recognize each recording section even if the disc drive 300 and the host computer 400 do not store therein a point at which the recording layer targeted for recording is changed (i.e. the layer jump point). Moreover, since each recording section has the same or substantially the same size, it is enough if the layer jump interval 121 is recorded into the RMA 104 (or 114) once. In other words, it is unnecessary to record the RMD every time the recording layer targeted for recording is changed, which does not cause a disadvantage that there is no more recordable recording area out of the RMA 104 (or 114). Thus, it is possible to continue the recording operation.

Then, even if the optical disc 100 is ejected from the disc drive 300 before the finalize process, it is possible to preferably recognize the data structure on the optical disc 100 (specially, the structure of each recording section), by referring to the layer jump interval 121 recorded in the RMA 104 (or 114), even in the case where the data is alternately recorded in respective recording layers. Namely, it is possible to obtain the size of each recording section from the layer jump interval 121, so that it is possible to recognize the data structure on the optical disc 100 (specially, the structure of each recording section), preferably and relatively easily, by performing a predetermined operation or calculation process, on the host computer 400 (or the disc drive 300).

Moreover, a method of recording the data into the same or substantially the same recording section (i.e. of a fixed length size) as described above will be briefly discussed. In this case, it is judged whether or not the size of the data to be recorded in the recording operation is larger than the size of the recording section.

As a result of the judgment, if it is judged that the size of the recording section is larger, the data to be recorded is recorded into one portion of the recording section.

On the other hand, if it is judged that the data to be recorded is larger, one portion of the data to be recorded is recorded into the entire one recording section. Then, the rest of the data to be recorded which is not recorded yet is recorded into one portion of another recording section. More specifically, if the size of each recording section is 10 MB and the size of the data to be recorded is 15 MB, 10 MB of the data is recorded into one recording section, and 5 MB of the data is recorded into another recording section. Obviously, if the data larger than the total size of the two recording sections is recorded, one portion of the data may be recorded into all of the one recording section and the other section, and furthermore, the rest of the data may be recorded into another recording section.

Moreover, as discussed in detail in FIG. 4 and FIG. 5, if the data is recorded as the border area, a border close process is performed every time the recording of the data into each border area is ended. In other words, the border-in areas 106 and 116 and the border-out areas 107 and 117 are formed. If the various management information or the like is recorded in the border-in areas 106 and 116 and the border-out areas 107 and 117, the reproduction can be performed on a DVD-ROM player which can recognize the multi-border structure of the optical disc.

Moreover, in the above-mentioned embodiment, the optical disc 100 is explained as one example of the information recording medium, and the recorder related to the optical disc 100 is explained as one example of the information recording apparatus. The present invention, however, is not limited to the optical disc and the recorder thereof, and can be applied to other various high-density-recording or high-transmission-rate information recording media, and the recorders thereof.

The present invention is not limited to the above-described embodiments, and various changes may be made, if desired, without departing from the essence or spirit of the invention which can be read from the claims and the entire specification. An information recording medium, an information recording apparatus and method, and a computer program for recording control, which involve such changes, are also intended to be within the technical scope of the present invention.

INDUSTRIAL APPLICABILITY

The information recording medium, the information recording apparatus and method, and the computer program of the present invention can be applied to, for example, a high-density optical disc, such as a DVD, and further to an information recording apparatus, such as a DVD recorder. Moreover, they can be applied to an information recording apparatus or the like, which is mounted on or can be connected to various computer equipment for consumer use or business use, for example.

The invention claimed is:

1. An information recording medium, comprising:
a first recording layer and a second recording layer in which record information can be recorded,
at least one of said first recording layer and said second recording layer comprising a size area to record therein size information which indicates an interval of layer jump from said first recording layer to said second recording layer in a recording zone including a partial recording area of said first recording layer and a recording area of said second recording layer located in a position facing the partial recording area.

2. The information recording medium according to claim 1, wherein the interval of the layer jump in the recording zone is substantially the same.

3. The information recording medium according to claim 1, wherein a recording unit of the record information is an ECC block unit.

4. The information recording medium according to claim 1, wherein at least one of said first recording layer and said second recording layer comprises an identification information recording area to record therein identification information for identifying a position of the recording zone.

5. The information recording medium according to claim 1, wherein said information recording medium is a write-once type information recording medium.

6. The information recording medium according to claim 1, wherein the size area is included in a recording management area into which recording management information for managing recording of the record information is recorded.

7. An information recording apparatus, comprising:
a recording device for recording record information onto an information recording medium, comprising a first recording layer and a second recording layer in which the record information can be recorded; and
a first controlling device for controlling said recording device to record size information which indicates an interval of layer jump from said first recording layer to said second recording layer in a recording zone including a partial recording area of said first recording layer and a recording area of said second recording layer located in a position facing the partial recording area, as the record information, into at least one of said first recording layer and said second recording layer.

8. The information recording apparatus according to claim 7, wherein said recording device records the record information while making the interval of the layer jump in the recording zone substantially the same.

9. The information recording apparatus according to claim 7, wherein-said recording device records the record information by an ECC block unit.

10. The information recording apparatus according to claim 7, further comprising a second controlling device for controlling said recording device to record identification information for identifying a position of the recording zone, as the record information.

11. The information recording apparatus according to claim 7, wherein said information recording medium is a write-once type information recording medium.

12. The information recording apparatus according to claim 7, wherein said first controlling device controls said recording device to record the size information into a recording management area into which recording management information for managing recording of the record information is recorded.

13. The information recording apparatus according to claim 7, further comprising a preparing device for preparing control information to control at least one of recording and reproduction of the record information, on the basis of the size information.

14. An information recording method, comprising:
a recording process of recording record information onto an information recording medium, comprising a first recording layer and a second recording layer in which the record information can be recorded; and
a first controlling process of controlling said recording process to record size information which indicates an interval of layer jump from said first recording layer to said second recording layer in a recording zone including a partial recording area of said first recording layer and a recording area of said second recording layer located in a position facing the partial recording area, as the record information, into at least one of said first recording layer and said second recording layer.

15. A computer program product in a computer-readable medium for tangibly embodying a program of instructions executable by a computer provided in an information recording apparatus, to make the computer function as a first controlling device,
said information recording apparatus, comprising:
a recording device for recording record information onto an information recording medium, comprising a first recording layer and a second recording layer in which the record information can be recorded; and
said first controlling device for controlling said recording device to record size information which indicates an interval of layer jump from said first recording layer to said second recording layer in a recording zone including a partial recording area of said first recording layer and a recording area of said second recording layer located in a position facing the partial recording area, as the record information, into at least one of said first recording layer and said second recording layer.

* * * * *